United States Patent
Chong et al.

(10) Patent No.: US 8,291,209 B2
(45) Date of Patent: Oct. 16, 2012

(54) INTEGRATION MODEL FOR INSTANT-ON ENVIRONMENT

(75) Inventors: Benedict T. Chong, San Jose, CA (US); Philip Sheu, San Jose, CA (US); Thomas Deng, Cupertino, CA (US); Victor Chin, San Jose, CA (US); Xun Fang, Livermore, CA (US); Jian-Jung Shiu, Taipei (TW); Hong-Sheng Wang, Taipei (TW); Wen-Pin Tsai, Taipei (TW); Wei-Nan Lin, Taipei (TW)

(73) Assignee: Splashtop Inc., San Jose, CA (US)

(*) Notice: Subject to any disclaimer, the term of this patent is extended or adjusted under 35 U.S.C. 154(b) by 1109 days.

(21) Appl. No.: 12/184,374

(22) Filed: Aug. 1, 2008

(65) Prior Publication Data

US 2009/0037722 A1 Feb. 5, 2009

(51) Int. Cl.
G06F 9/00 (2006.01)
G06F 15/177 (2006.01)

(52) U.S. Cl. ........................................... 713/2
(58) Field of Classification Search .................. 713/1, 2, 713/100; 718/1
See application file for complete search history.

(56) References Cited

U.S. PATENT DOCUMENTS

| 6,727,920 | B1 | 4/2004 | Vineyard, Jr. et al. | |
| 6,775,768 | B1 | 8/2004 | Raspe | |
| 7,546,449 | B2 * | 6/2009 | Wu | 713/2 |
| 2006/0064688 | A1 * | 3/2006 | Tseng | 718/1 |
| 2006/0149956 | A1 | 7/2006 | Chang | |

* cited by examiner

Primary Examiner — Kim Huynh
Assistant Examiner — Michael J Brown
(74) Attorney, Agent, or Firm — Michael A. Glenn; Glenn Patent Group

(57) ABSTRACT

An instant-on environment consists of components residing in a computer boot ROM and/or also on a mass storage device. Main components to the instant-on environment include a loader, EPG1, and EPG2. The loader is a module that is integrated into the computer boot ROM, based on an embedded OS, that functions to load other instant-on environment components. There are various methods of integrating the loader into boot firmware to optimize for different requirements. EPG1 is a first user screen that appears on the computer display within seconds after power-on, and from which the user can choose to launch one of the instant-on environment's applications or launch the primary OS. EPG2 is launched if the user chooses to launch an instant-on environment application. EPG2 is a Linux-based desktop environment that the user enters once he selects an application from EPG1.

1 Claim, 6 Drawing Sheets

INTEGRATION MODEL FOR INSTANT-ON ENVIRONMENT

BACKGROUND OF THE INVENTION

1. Technical Field

The invention relates to a method and apparatus for system integration in an instant-on computer environment.

2. Description of the Prior Art

It is common to run more than one operating system (OS) and related applications on a computer system at the same time, using virtualization software. Virtualization provides a container environment, in which another operating system may run, sometimes without any knowledge that it is running inside the container, rather than directly on physical hardware. An operating system and related applications which run inside this contained environment are often referred to as a virtual machine (VM). Virtualization is generally comprised of a software component, often referred to as a hypervisor, and sometimes specialized hardware features to facilitate virtualization on the computer system.

Virtualization can be used in situations where it is desired to run a software environment, e.g. Microsoft Windows, which is not compatible with the software environment, e.g. Linux, currently running on a computer system. In this example, the Linux environment runs natively on the computer system hardware, and is often referred to as a host. The example Windows environment runs inside a VM, sometimes also referred to as a guest.

In fact, more than one VM can potentially be run using virtualization, with each VM running an arbitrary and unique software environment. Various applications are typically run in both the VM and host systems. For some commonly used or needed tasks, such as web browsing or DVD playback, applications may be provided in any combination of VMs and the host system.

Virtualization provides a potential for instant-on operation of a personal computer. One aspect of virtualization thus concerns the integration of an instant-on environment into a platform, e.g. a personal computer. It would therefore be advantageous to provide a method and apparatus that integrates an instant-on environment onto a platform.

SUMMARY OF THE INVENTION

An embodiment of the invention provides an instant-on environment that consists of an embedded OS component, i.e. a loader which resides in the boot ROM, and other components, including a Linux-based environment, which reside on a mass storage device. The mass storage device is typically either a hard drive or a flash memory embedded on the motherboard.

The loader is a module based on an embedded OS that is responsible for booting the remainder of the instant-on environment. It is to be integrated into system boot firmware, e.g. BIOS or UEFI, and resides in the boot ROM.

Some components on mass storage can be combined with the loader and be placed together into a boot ROM. One such example is the embedded OS that provides the initial user interface (EPG1, or electronic programming guide 1). EPG1 can be moved from mass storage and combined with the loader, to further reduce boot time and remove its dependency on mass storage.

An embodiment of the invention integrates the instant-on environment onto a platform. A large part of this effort concerns integration of the loader into the system boot firmware (BIOS or UEFI). One aspect of the invention concerns an integration method that has various options that may be selected to suit the individual needs of different platforms. Such options include, for example:

- A basic or advanced integration method;
- Entering the OS via restart, BIOS/UEFI API, or other methods;
- Powering down via direct chipset control or BIOS/UEFI API;
- For USB support, using BIOS/UEFI emulation or a native embedded OS driver; and
- For SATA support, using legacy PATA mode or native SATA modes.

System-level considerations determine the choice of integration method and options. These considerations include, for example:

- Is the instant-on environment initiated by a dedicated hotkey or by the power button? The dedicated hotkey can be either a physical button or a keyboard key.
- At what point during BIOS/UEFI boot is the loader called? Near the end of BIOS/UEFI boot process or much earlier?
- Robustness of BIOS/UEFI's USB emulation.
- Robustness of BIOS/UEFI's SATA emulation.
- Whether to enable the user to enter BIOS/UEFI setup from EPG1.

On platforms where the instant-on environment is initiated by a dedicated hotkey, the platform boots to the instant-on environment only when that hotkey is used to power on the platform. In this case, when the normal power button is used to power on, the platform boots to the primary OS.

On platforms where the instant-on environment is initiated by the normal power button, the platform always boots to the instant-on environment (its EPG1) when the power button is pressed. EPG1 becomes the default boot screen. At EPG1, the user can choose to use the instant-on environment or continue booting to the primary OS.

DETAILED DESCRIPTION OF THE INVENTION

Definitions

Figure 1:
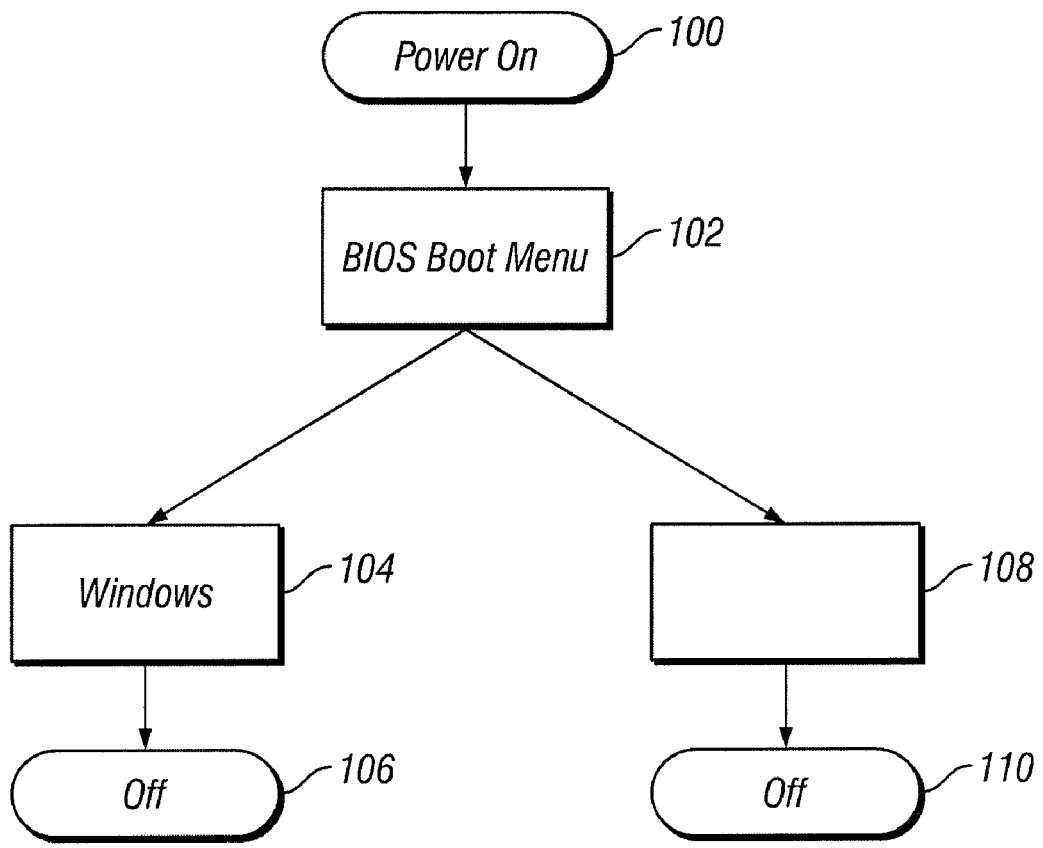
FIG. 1 is a flow diagram showing a BIOS/UEFI boot menu according to the invention.

The following terms shall have the meaning of the description associated therewith herein:

| Term | Description |
| --- | --- |
| CE | The core engine is the embedded OS that is at the heart of the loader and EPG1. |
| EPG1 | The electronic programming guide 1 is the first user menu that appears. |
| EPG2 | The electronic programming guide 2 is the Linux-based desktop environment that the user enters once he selects an application from EPG1. |
| Instant-on Environment | The instant-on environment consists, at least in part, of a CE-based component, i.e. the loader, which resides in the boot ROM and other components, including a Linux-based environment which reside on a mass storage device. |
| loader | Small module based on CE that is responsible for booting the remainder of the instant-on environment. It is integrated into the system boot firmware (BIOS or UEFI) and resides in the boot ROM. |
| VAE | The virtual appliance environment is the Linux-based environment that is at the heart of EPG2. |
| BEV | The bootstrap entry vector appears as a boot device on the BIOS boot menu. UEFI-based boot firmware has its own equivalent of BEV. |

Instant-on Environment Overview

An embodiment of the invention is an instant-on environment that consists of components residing in the boot ROM and also on a mass storage device. In one presently preferred embodiment there are three main components to the instant-on environment: the loader, EPG1, and EPG2.

The loader is a small module that is integrated into the boot ROM. It is based on an embedded OS, i.e. the core engine CE (see, for example, PCT application no. PCT/US07/83499, filed Nov. 2, 2007). The role of the loader is to transition from the BIOS/UEFI execution environment to its own execution environment, e.g. switch from real mode to protected mode in the case of BIOS, and then load the other instant-on environment components, e.g. EPG1 and EPG2. The embedded OS provides the necessary services (SATA, USB, etc.) for loading the other components. A few data structures in memory, e.g. headers, are defined for the purpose of exchanging the information necessary for the loading process. The loader typically has no user-visible component.

The electronic programming guide 1 (EPG1) is the first user screen that appears within seconds after power-on. It is launched by the loader. On this screen, the user can choose to launch one of the instant-on environment's applications or launch the primary OS, e.g. Windows. If the user chooses to launch an instant-on environment application, EPG1 then launches EPG2. EPG1 is also based on the core engine.

In some embodiments of the invention, the EPG1 functionality can be combined with the loader, which resides in the boot ROM. This architecture has the advantage of further improved boot time and reduced dependence on mass storage.

The electronic programming guide 2 (EPG2) is a Linux-based desktop environment that the user enters once he selects an application from EPG1. This environment, based on a virtual appliance environment VAE (see, for example, U.S. patent application Ser. No. 11/772,700, filed Jul. 2, 2007), is where user runs all instant-on environment applications. EPG2 is loaded by EPG1.

Instant-on Environment User Experience

Several types of user experiences can be achieved with the instant-on environment. These are determined by, for example:

How the user launches the instant-on environment;
How the user launches the primary OS, e.g. Windows;
Whether the user can continue onto the primary OS, e.g. Windows, after exiting the instant-on environment;
Whether the instant-on environment is the default boot screen every time the user powers on the computer;
Whether the user can launch BIOS/UEFI setup from the instant-on environment; and
Boot speed.

BIOS/UEFI Boot Menu

This aspect of the invention uses the BIOS/UEFI boot menu to select a boot device from which to boot. The boot menu is a standard feature on all major BIOS/UEFI implementations. It is often used to select between booting from the hard disk or CD-ROM drive, etc. FIG. 1 is a flow diagram that shows the flow for this approach.

In this embodiment, the primary OS, e.g. Windows, resides on one boot device and the instant-on environment resides on another, e.g. USB, flash drive. To start the instant-on environment, the user presses a hotkey (100) to bring up the BIOS/UEFI boot menu (102) and then selects the instant-on environment boot device, i.e. Windows (104) or the instant-on environment (108). Note that once the user goes into the instant-on environment, he is not expected to go back to the primary OS without powering off or rebooting the system (106; 110).

Power-On Hotkey

Figure 2:
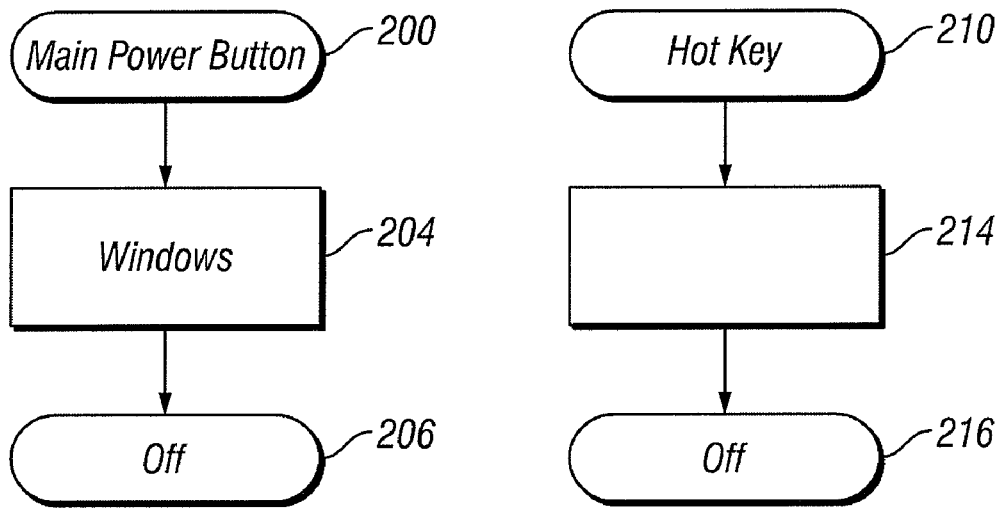
FIG. 2 is a flow diagram showing the execution flow for a power-on hotkey according to the invention.

This power-on hotkey provides a second way of powering on the PC and takes the user directly to the instant-on environment. FIG. 2 is a flow diagram showing the execution flow for a power-on hotkey according to the invention. The standard power button (200) still powers on the PC and boots the primary OS such as Windows (204). A secondary power-on hotkey (210) powers on the PC and boots the instant-on environment (214). Note that once the user goes into the instant-on environment, he is not expected to go back to Windows without powering off or rebooting the system (206; 216). An advantage of this approach is that there is almost no additional integration effort needed to switch to the primary OS from the instant-on environment. Entering the primary OS entails simply rebooting the system.

Instant-On Environment as the Default Boot Screen

Figure 3:
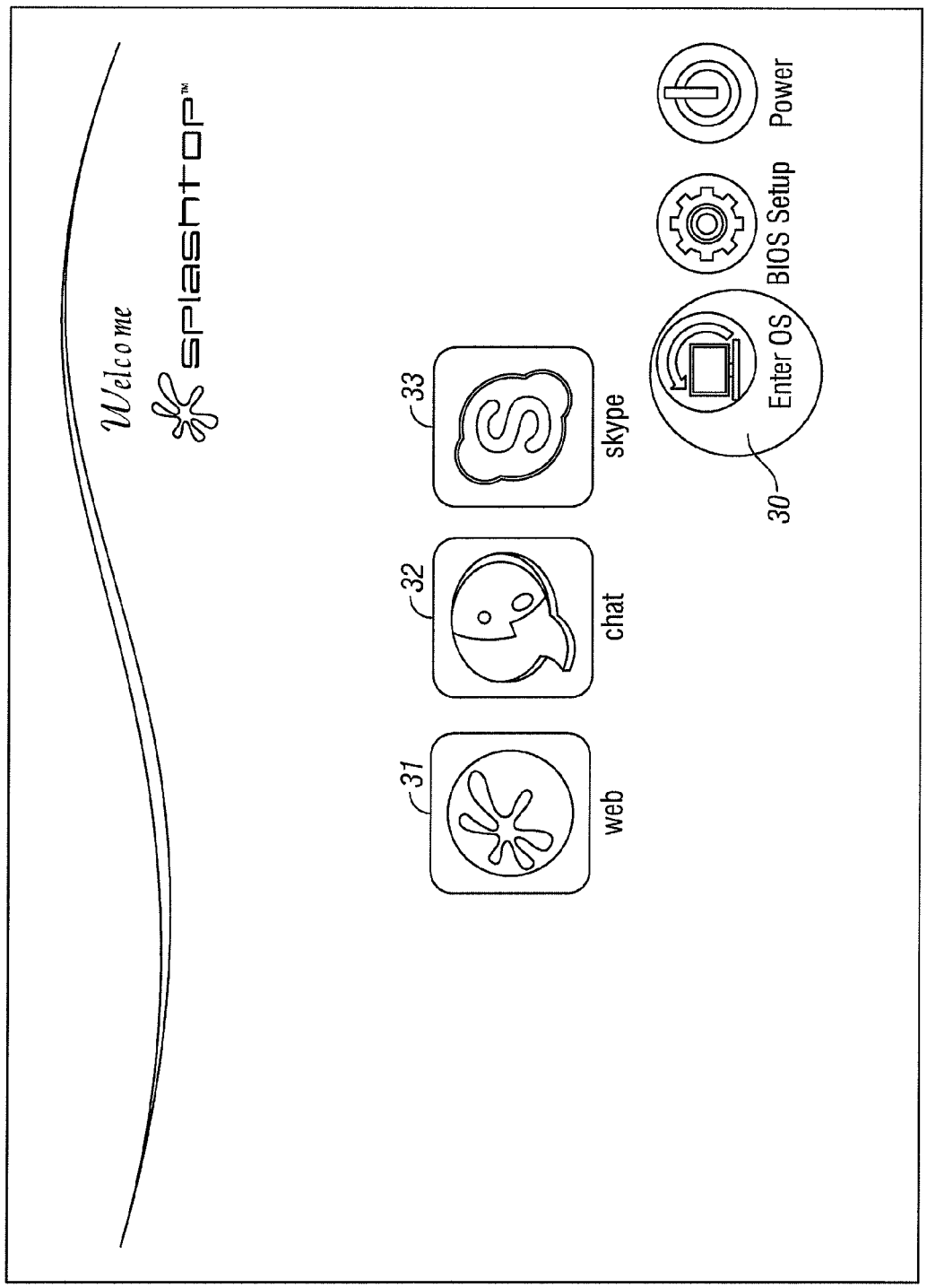
FIG. 3 is a screen shot that shows the example of an instant-on environment EPG1 screen with an enter OS icon according to the invention.

This aspect of the invention uses EPG1 as the default boot screen every time the user powers on the computer. The user has the option of booting Windows, or another primary OS, or launching one instant-on environment application, e.g. a web browser or Skype. FIG. 3 is a screen shot that shows an example of the instant-on environment EPG1 screen with an Enter OS icon 30. When the user clicks on this icon, EPG1 exits and the primary OS boots.

Figure 4:
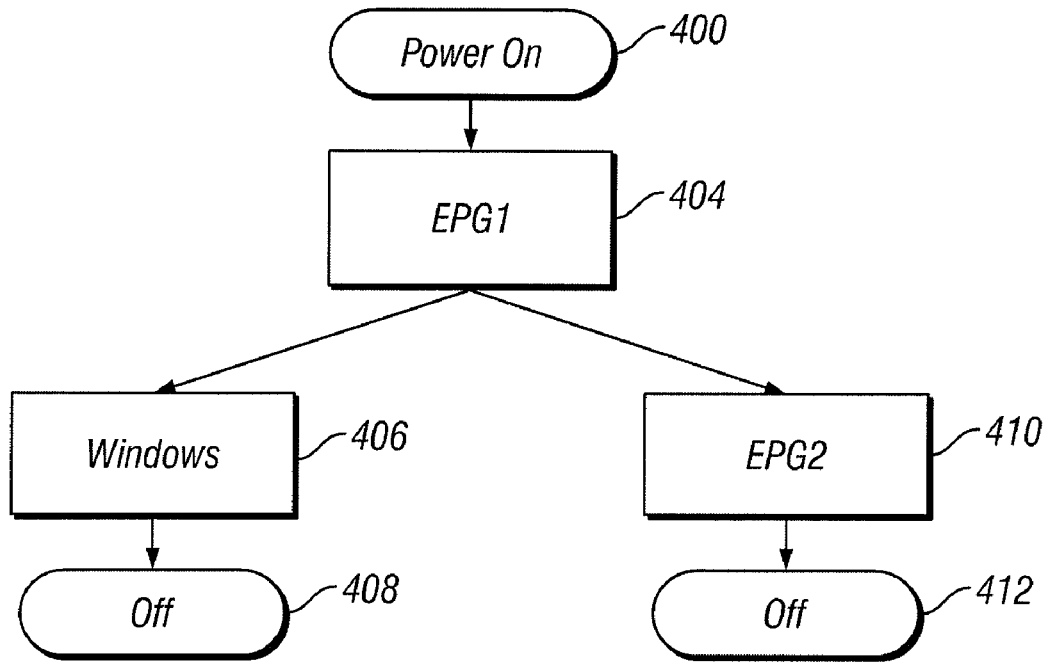
FIG. 4 is a flow diagram showing the execution flow when EPG1 is used as the default boot screen according to the invention.

FIG. 4 is a flow diagram showing the execution flow of a potential implementation when EPG1 is used as the default boot screen. The user powers the system on (400) and EPG1 is launched (404). When the user clicks on the web icon (31), chat icon (32), or Skype icon (33), EPG2 is launched (410). The user may also enter the primary OS, e.g. Windows (406), by selecting the Enter OS icon (30), as discussed above. The user can boot directly to the primary OS without first powering off or rebooting the system (408; 412).

Booting the Primary OS from the Instant-On Environment

Figure 5:
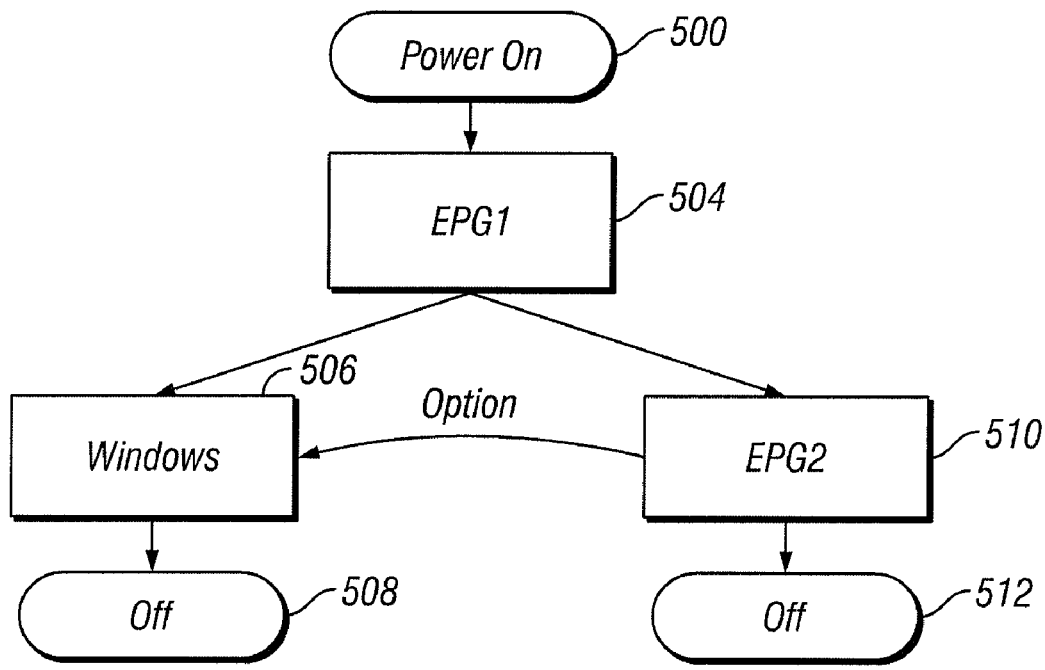
FIG. 5 is a flow diagram showing booting to a primary OS such as Windows from EPG2 according to the invention.

When the instant-on environment is used as the default boot screen, the user boots to Windows or some other primary OS from EPG1. An additional embodiment allows the user to boot to the primary OS from EPG2. FIG. 5 is a flow diagram showing booting to the primary OS from EPG2. The system is powered on (500) and EPG1 is launched (504). The user selects EPG2 (510) and, at some point, decides to enter the primary OS (506). The user can boot directly to the primary OS without first powering off or rebooting the system (508; 512).

BIOS/UEFI Setup from the Instant-On Environment

Figure 6:
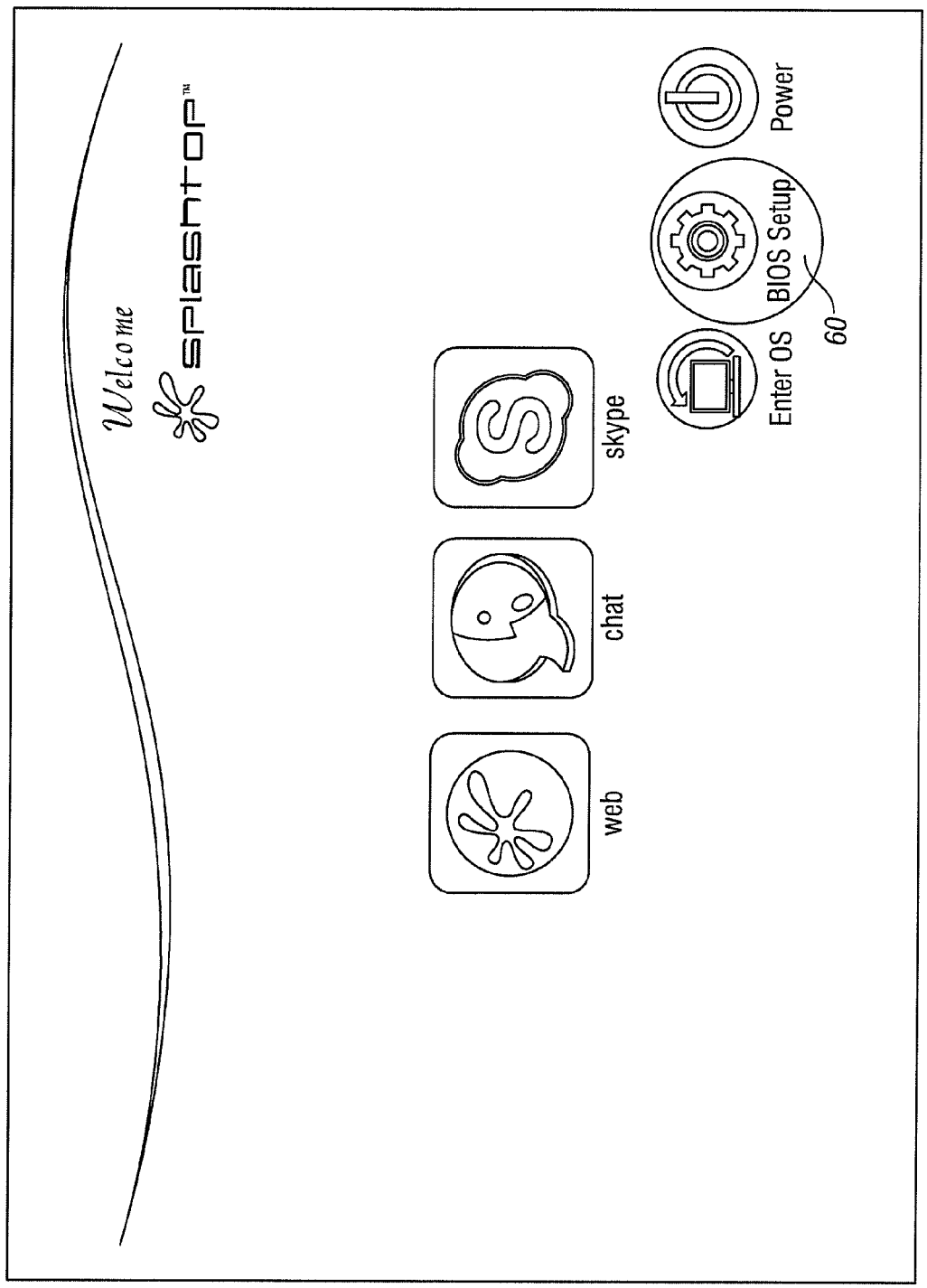
FIG. 6 is a screen shot that shows an example of an EPG1 screen with a BIOS/UEFI setup icon according to the invention.

When the instant-on environment is used as the default boot screen, an OEM can decide to allow the user to enter BIOS/UEFI setup from the instant-on environment instead of, or in addition to, using the standard hotkey to enter BIOS/UEFI setup during BIOS/UEFI boot process. In this embodiment, the user enters BIOS/UEFI setup by clicking on an icon in the EPG1 screen. FIG. 6 is a screen shot that shows an example of an EPG1 screen with a BIOS/UEFI Setup icon (60).

Figure 7:
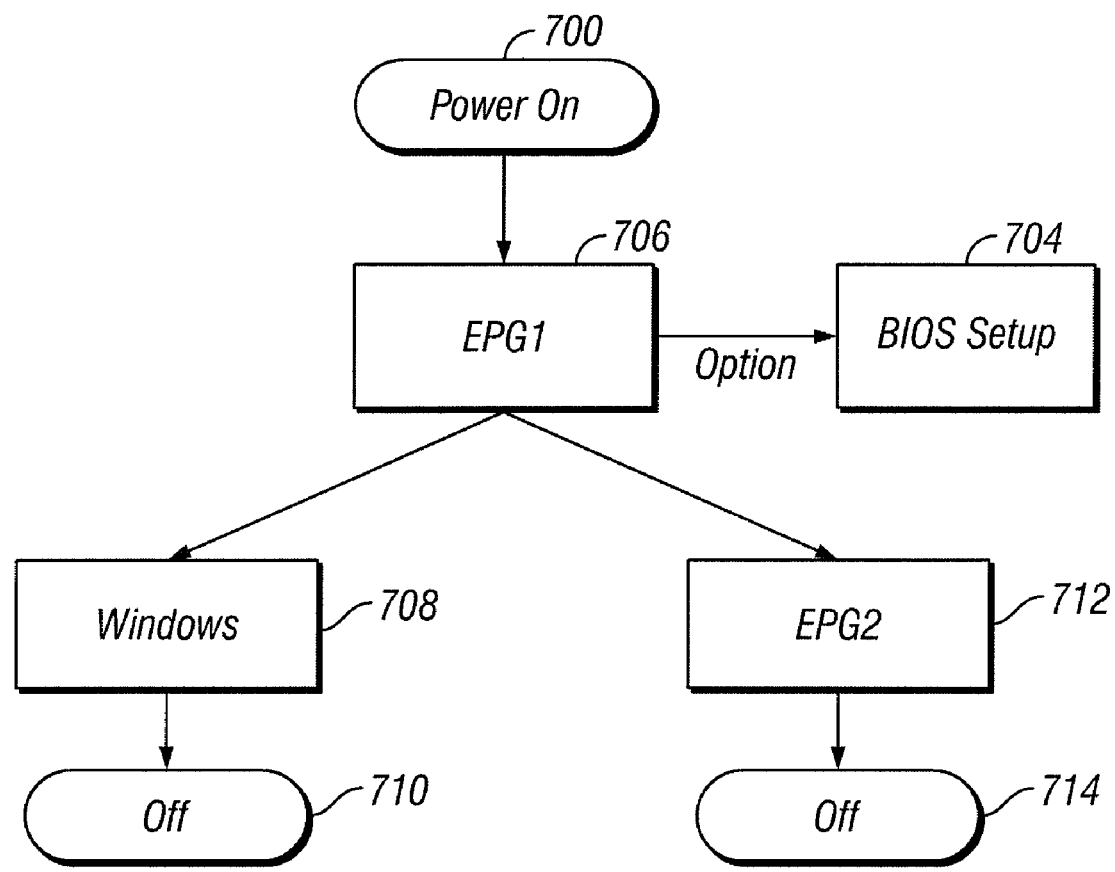
FIG. 7 is a flow diagram showing the execution flow for entering BIOS/UEFI Setup from EPG1 according to the invention.

FIG. 7 is a flow diagram showing the execution flow for entering BIOS/UEFI Setup from EPG1. The system is powered on (700) and EPG1 is launched (706). The user may enter BIOS/UEFI setup (704) from EPG1, or the system may enter BIOS/UEFI setup directly during the BIOS/UEFI boot process. From EPG1, the user may select the primary OS (708) or EPG2 (712). The user can enter BIOS/UEFI setup or boot directly to the primary OS without first powering off or rebooting the system (710; 714).

Boot Speed

One of the values of the instant-on environment is as a way for the user to get to the Internet quickly after power-on. The ability to achieve this depends on how fast the BIOS/UEFI can complete system boot and launch the instant-on environment. This integration methodology consisting of loader, EPG1, and/or EPG2 makes it is possible to launch the instant-on environment before completing the boot process, further reducing the boot time to the instant-on environment. This aspect of the invention is discussed below.

Basic Integration

The basic integration method is appropriate when:
 The instant-on environment is initiated by a dedicated power-on hotkey separate from the standard power button. This can either be a physical button or a keyboard key. A simple restart from the instant-on environment always results in booting the primary OS; no special modifications to BIOS/UEFI are required. BIOS/UEFI invokes the instant-on environment only when the dedicated hotkey is used to power on.
 The loader is invoked near the end of the standard boot process, just before INT19h in the case of BIOS. This is a viable approach if BIOS/UEFI can complete its full boot process quickly enough.
 EPG1 supports the particular chipset and can power down the computer via direct control of the chipset.
 Restart can be done via standard mechanisms.
 There is no provision to enter BIOS/UEFI setup from the instant-on environment.

BIOS/UEFI Requirements
 Have 64 KB free in boot ROM.
 BIOS/UEFI must provide a standard mechanism for the instant-on environment to determine the top of the available memory range. In the case of BIOS, this can be the INT15h Get Memory Size function (INT15h, ax=E801h). The instant-on environment assumes the region between 1 MB and this top of memory value is available for its use. BIOS/UEFI must take care to exclude any important data structures, e.g. ACPI tables, from this range.
 BIOS/UEFI does not need to fill in the loader header. That is only needed for advanced integration method.

Integration Process

Merging the Image

Merge the binary image of the instant-on environment's loader into the system boot firmware (BIOS or UEFI) image. The loader image comes pre-compressed, so there is no need to apply additional compression.

The loader can be implemented as a simple binary or as a standard option ROM (in the case of BIOS) or a device module (in the case of UEFI). In the case of BIOS, loader is configured as a BEV device.

BIOS/UEFI invokes the loader only if the platform is powered on using the pre-defined hotkey.

Invoking the Instant-On Environment

Invoking the instant-on environment loader consists of three steps. BIOS/UEFI boot firmware is modified to include these three steps.
(1) Locate and parse the loader header in memory. The header contains information needed for loading the loader.
(2) Copy the loader from the boot ROM to RAM. Header specifies the total size to copy.
(3) BIOS/UEFI hands control of the system to loader, e.g. make a JUMP or CALL to loader code.

Enter OS

For the basic integration method, enter OS function is implemented in EPG1 and EPG2 as a simple restart. No special BIOS/UEFI modification is needed. The assumption is that restarting from the instant-on environment always results in booting the primary OS.

Power Off

For the basic integration method, power off is handled directly by the chipset driver in EPG1 and by the ACPI module in EPG2. No special BIOS/UEFI support is needed.

Advanced Integration

Advanced integration method is used when:
 The platform has only one power button that is used for both booting into the instant-on environment and booting into the primary OS. EPG1 is the default screen that shows up on every power-on. This means the enter OS function cannot be implemented as a simple restart.
 The loader is invoked early in standard boot process, e.g. not right before INT19h in the case of BIOS. This is to achieve faster boot time on platforms where BIOS/UEFI boot process is not fast enough.
 Power down or restart in EPG1 or EPG2 cannot be handled via native chipset support and via ACPI for some reason. In this case, it must be done via a BIOS/UEFI API or via return code when EPG1 exits to BIOS/UEFI.
 The standard mechanism for determining available memory range (e.g. INT15h in the case of BIOS) cannot provide accurate information on the memory range usable by the instant-on environment.
 Platform model information is not available via standard data structures, e.g. SMBIOS table in the case of BIOS.
 Being able to enter BIOS/UEFI setup from the instant-on environment is a requirement.

BIOS/UEFI Requirements
 Have 64 KB free in boot ROM.
 BIOS/UEFI typically needs to fill in some fields in the loader's header.
 BIOS/UEFI must inform the loader of the top of memory range available to the instant-on environment. This can be done by filling in the loader header. If this field in the loader header is not valid, the standard mechanism for determining the available memory range e.g. INT15h Get Memory Size function in the case of BIOS, must then return the correct value. The instant-on environment assumes that the region between 1 MB and this top of memory value is available for its use. BIOS/UEFI must take care to exclude any important data structures, e.g. ACPI tables, from this range.

If EPG1 and EPG2 cannot perform any needed functions via direct hardware access, e.g. restart, power off, then BIOS/UEFI must enable EPG1 and EPG2 to do so by either providing API calls or acting on return codes when EPG1 exits to BIOS/UEFI.

If the ability to enter BIOS/UEFI setup is required in the instant-on environment, then BIOS/UEFI must enable EPG1 to do so by either providing API calls or acting on return codes when EPG1 exits.

Integration Process

Follow the same integration process as basic integration method. One difference is BIOS/UEFI always launches the instant-on environment as long as the instant-on environment is not disabled in BIOS/UEFI setup. There is no separate power-on hotkey for launching the instant-on environment.

Additionally:

Add BIOS/UEFI code to fill in the loader's header properly.

Create additional fields in BIOS/UEFI setup for any options that need to be configurable by user (enable/disable, countdown timer value, reset user data).

The loader header is used to exchange the following information between the instant-on environment and BIOS/UEFI:

User settings in BIOS/UEFI setup (enable/disable, countdown timer value, reset user data);

Top of memory range usable by the instant-on environment;

Whether BIOS/UEFI provides restart, power off, or enter BIOS/UEFI setup functions for EPG1;

Whether EPG1 wants BIOS/UEFI to enter OS, restart, power off, or enter BIOS/UEFI setup upon exiting;

Vendor and platform information; and

Function pointers for APIs provided by BIOS/UEFI.

Note that the flow can involve EPG1 exiting out to BIOS/UEFI and BIOS/UEFI then continuing its execution based on the return codes from EPG1. The software and hardware states needed for BIOS/UEFI to function must be properly upon EPG1 exit.

Enter OS

The method used by basic integration of simply restarting does not work because the system would restart right back into the instant-on environment, rather than booting the primary OS. Enter OS function can be implemented in several ways:

BIOS/UEFI provides an API, e.g. a SMI function, for enter OS. EPG1 and EPG2 can call this API when user chooses enter OS. How this function achieves enter OS is up to the particular BIOS/UEFI implementation. A simple approach is for the function to set a one-time flag then restart. On the next boot, BIOS/UEFI sees the one-time flag and bypasses the loader.

BIOS/UEFI provides an API, e.g. a SMI function, or a mechanism for EPG1 and EPG2 to set a flag accessible by BIOS/UEFI. EPG1 and EPG2 can set this flag, then restart the system. Upon restarting, BIOS/UEFI sees the flag, clears it, and skips the instant-on environment on this boot. The mechanism may be as simple as a token in NVRAM e.g. CMOS, which EPG1 and EPG2 can directly write. Loader header makes provision for BIOS/UEFI to specify the I/O ports which the instant-on environment can use to access the NVRAM.

When user chooses enter OS from EPG1, EPG1 can exit to BIOS/UEFI, and BIOS/UEFI continues its normal boot process. However, this approach does not cover EPG2. This approach reduces the amount of time to enter OS because the standard boot process is not re-run.

For BIOS/UEFI to be able to continuing its execution properly when EPG1 exits to it, all software and hardware states needed for BIOS/UEFI to function must be properly restored after EPG1 exits.

Power Off

The power off function can be implemented in several ways.

For EPG1:

EPG1 supports the particular chipset and can power off the system via direct control of the chipset.

Where this is not possible, BIOS/UEFI can provide an API, e.g. a SMI function, for power off.

Alternatively, EPG1 can exit to BIOS/UEFI while passing the appropriate flag via the header, for BIOS/UEFI to act on the power off exit flag.

For BIOS/UEFI to be able to power down properly when EPG1 exits to it, BIOS/UEFI may need to ensure that some software and hardware states are properly restored after EPG1 exits.

For EPG2:

EPG2 powers off via ACPI.

Where ACPI is not available, BIOS/UEFI can provide an API, e.g. a SMI function for power off.

Other Integration Concepts

If the standard BIOS/UEFI boot menu is used to launch the instant-on environment, the loader may not be required. This can enable the instant-on feature without requiring any changes to system boot firmware. EPG1 and EPG2 are on a bootable mass storage device, e.g. USB flash drive, that is set up to boot EPG1 from its boot sectors. A small amount of loader code and EPG1 can reside in hidden sectors. EPG2 can reside on a filesystem as files. The mass storage device can be embedded onto the motherboard or can be an external device.

To enable the user to enter BIOS/UEFI setup from EPG1, the choices of implementation methods are similar to the choices previously described for enter OS:

Set a flag and reboot the system. If the flag is set, then BIOS/UEFI enters BIOS/UEFI setup directly upon reboot.

Call a BIOS/UEFI API. This custom API runs through selected tasks from the standard boot process to restore the necessary system and hardware state and enters BIOS/UEFI Setup.

Boot Time Enhancement

The architecture of the instant-on environment enables it to be functional without system BIOS/UEFI completing its standard boot process. This attribute is advantageous for systems whose BIOS/UEFI boot process takes a long time to complete. It is also advantageous even for systems with quick BIOS/UEFI boot process, by making the instant-on environment come up even more quickly.

This is possible because the instant-on environment (loader, EPG1, and EPG2) are protected mode operating systems with their own device drivers. Therefore, only minimal system initialization is needed in order for the instant-on environment to run. Examples of the minimal system components that must be initialized include the CPU, memory, and chipset.

Description of Boot Sequence

Figure 8:
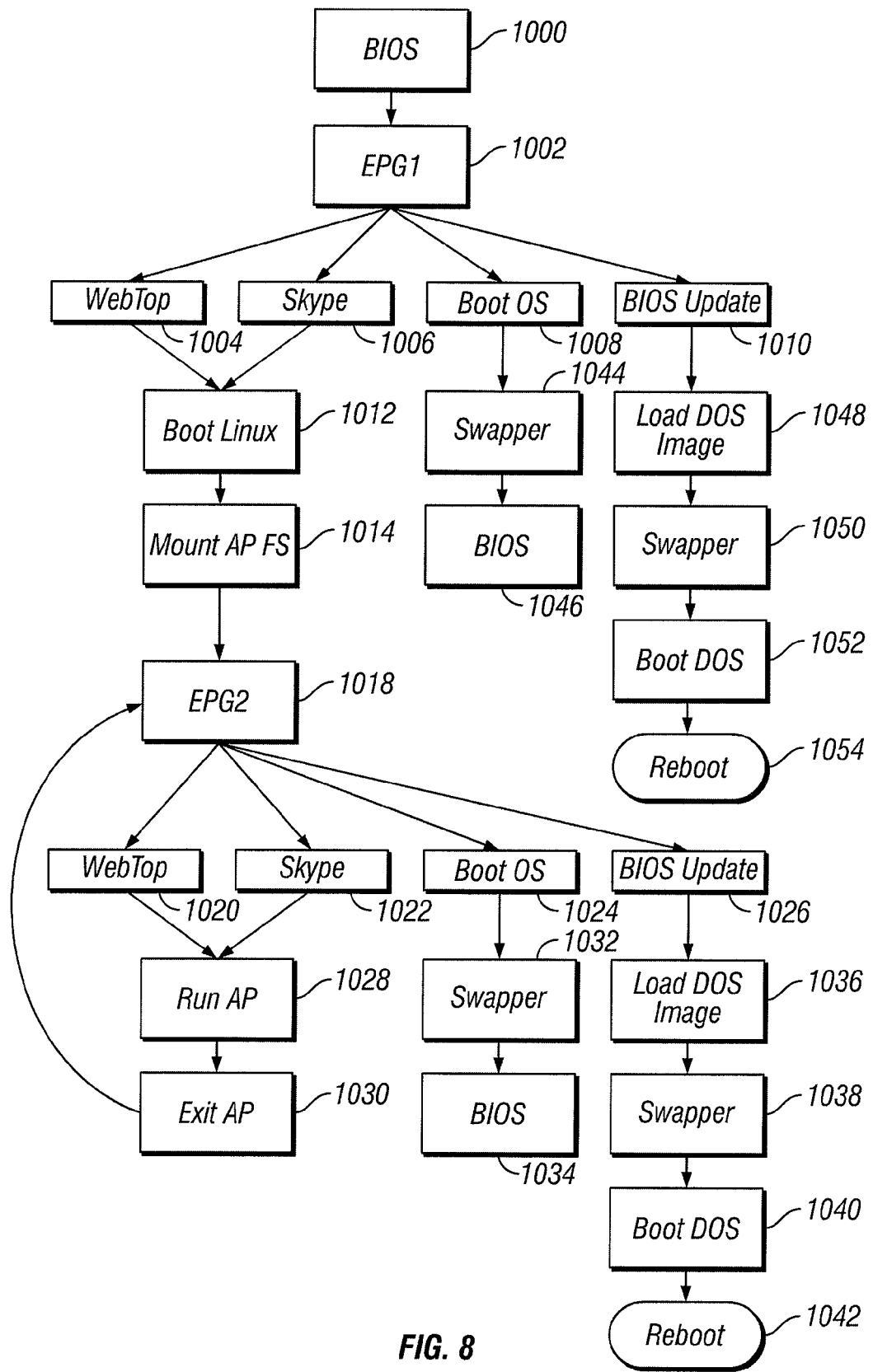
FIG. 8 is a flow diagram that shows the complete boot sequence according to the invention.

FIG. 8 is a flow diagram that shows the boot sequence for an embodiment of the invention that comprises of two virtual appliances (browser and Skype), as well as "boot OS" and "BIOS update" functions. The boot firmware is BIOS-based in this case. In FIG. 10 BIOS is booted (1000) and EPG1 is launched (1002). The user is presented with an user interface for selecting amongst starting a browser virtual appliance (Webtop) (1004), starting a Skype virtual appliance (1006), booting to the main OS (1008), and updating BIOS (1010). If the user selects either Webtop or Skype, Linux is booted (1012), filesystem of the selected virtual appliance (Webtop or Skype) is mounted (1014), the selected virtual appliance is launched, and EPG2 is displayed (1018). EPG2 also contains a user interface for selecting amongst the Webtop (1020), Skype (1022), boot OS (1024), and BIOS update (1028)

options. If Webtop or Skype is subsequently selected using the EPG2 user interface, the application is run (1028) and then exited (1030) upon user command. If the option to boot OS is selected from EPG1 (1008), then system state is restored (1044) and control is returned to BIOS for BIOS to resume its execution and boot the primary OS (1046); likewise, if the option to boot the OS is selected from EPG2 (1024), then system state is restored (1032) and control is returned to BIOS (1034). If BIOS update is selected from EPG1 (1010), then the DOS image that encapsulates the BIOS update utility is loaded (1048), system state is modified to enable booting to DOS (1050), DOS is booted (1052), and the system reboots after completion of BIOS update (1054); likewise, if BIOS update is selected from EPG2 (1028), then the DOS image that encapsulates the BIOS update utility is loaded (1036), system state is modified to enable booting to DOS (1038), DOS is booted (1040), and the system reboots after completion of BIOS update (1042).

EPG1

In this embodiment of the invention, the BIOS is modified to launch the instant-on environment instead of the normal operating system. When EPG1 comes up, it can load the Linux kernel and initial RAM disk files into memory in the background.

Booting Linux Virtual Appliances

In this embodiment of the invention, if the user chooses WebTop or Skype, EPG1 boots the Linux kernel. A parameter is passed onto the Linux kernel to tell it which virtual appliance (WebTop or Skype) was selected by the user. Once the Linux kernel comes up, it mounts the filesystem image of the selected application. This filesystem image is laid out as a file on the computer's mass storage device. When the kernel mounts the filesystem image, a set of application binaries and subdirectories appear in the Linux file system. The Linux kernel then launches the application (WebTop or Skype).

Boot to OS

In this embodiment of the invention, when the user selects boot to OS to boot into the primary OS on the hard disk, e.g. Windows, or some other boot devices, e.g. CDROM, etc., EPG1 restores system state and exits to BIOS for BIOS to resume its boot process. BIOS may also need to restore some system state. At the end of BIOS's boot process, BIOS will attempt to boot from devices according to the BIOS boot priority. For example, the BIOS attempts to boot from CDROM, then via PXE, then from the hard disk, etc.

BIOS Update

Updating the BIOS can be implemented in several ways:
By booting into DOS stored on a mass storage partition and accessing the DOS-based BIOS update software and binary file;
By booting a floppy disk image containing DOS and the DOS-based BIOS update software; and
By using a Linux-based updater packaged as a virtual appliance within EPG2.

EPG2

EPG2 is the Linux environment where the Linux-based virtual appliances (Webtop or Skype) run. It provides an user interface which resembles that of EPG1, to maintain familiarity to the user. When there are more virtual appliance options than what EPG2's interface can display, it is possible to add elements of scrolling to expand the number of possible options, e.g. insert a right arrow. When the user clicks on the arrow, the icons shift left. A left arrow appears to allow the user to shift the icons right.

Discussion of the Application File System

As discussed above, each Linux-based virtual appliance is stored as a filesystem image. Each filesystem image is just a file on a mass storage partition. This simplifies the update process and the addition of virtual appliances. Updating a virtual appliance equates to simply replacing one file on the mass storage partition.

Accessing Onboard Mass Storage

In one embodiment of the invention, the mass storage for storing EPG1 and EPG2 is NAND flash memory embedded on the motherboard. This storage should not be directly accessible by the user since it's for storing the instant-on environment's program files. One solution is to use a FET switch to control the power to the flash memory. BIOS/UEFI enables power to the flash memory via an I/O pin during the boot process before launching the instant-on environment. This allows the detection of the flash memory and allows the instant-on environment to launch successfully.

When the user wants to boot to the primary OS, the instant-on environment exits back to BIOS/UEFI. At this point, BIOS/UEFI turns off the FET, which powers off the flash memory.

In Windows, when the user runs the update utility which does need to access the flash memory, the FET is turned on again. This makes the flash memory visible, similar to an insertion event (if the flash memory's interface is USB-based). This allows files to be written to the flash memory. At the end of the update process, the FET is turned off again.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An instant-on environment for a computer comprising a boot ROM and a mass storage device, wherein the mass storage can be either hard disk or flash memory, said instant-on environment comprising:
  a loader that is integrated into said boot ROM, based on an embedded OS, and that functions to load other instant-on environment components;
  an EPG1 interface element comprising a first user screen that appears on a computer display within seconds after power-on, and from which a user can choose to launch one of a plurality of instant-on environment applications or launch a primary OS;
  an EPG2 interface element that is launched if said user chooses to launch an instant-on environment application, wherein said EPG2 interface element comprises a desktop environment that said user enters once an application is selected from said EPG1 interface element; and
  wherein said instant-on environment comprises any or all of said loader, EPG1, and EPG2, and resides in any one or all of said boot ROM and mass storage;
  wherein the computer always boots first to said loader and said EPG1, instead of to said primary OS; and
  wherein said loader further comprising means for:
  switching between real and protected modes;
  calling BIOS/UEFI's various software services and APIs; and
  further comprising:
  data structures in memory, comprising headers, that are integral to a boot process, said headers comprising:
  a header which BIOS/UEFI can programmatically find and which provides BIOS/UEFI with the necessary information to successfully run the loader; and
  a header that is used for exchanging information between said BIOS/UEFI and said instant-on environment.

* * * * *